(12) United States Patent
Kusafuka et al.

(10) Patent No.: US 6,571,162 B2
(45) Date of Patent: May 27, 2003

(54) CONTROLLER FOR AUTOMATIC TRANSMISSION

(75) Inventors: Muneo Kusafuka, Anjo (JP); Masamichi Unoki, Anjo (JP); Masakatsu Iwase, Anjo (JP)

(73) Assignee: Aisin Aw Co., Ltd., Anjo (JP)

( * ) Notice: Subject to any disclaimer, the term of this patent is extended or adjusted under 35 U.S.C. 154(b) by 0 days.

(21) Appl. No.: 09/789,016

(22) Filed: Feb. 21, 2001

(65) Prior Publication Data
US 2002/0013650 A1 Jan. 31, 2002

(30) Foreign Application Priority Data
Feb. 23, 2000 (JP) .......................................... 2000-045732

(51) Int. Cl.$^7$ ................................................ G06F 7/00
(52) U.S. Cl. ............................... 701/51; 701/55; 701/56
(58) Field of Search ............................ 701/51, 55, 56, 701/72; 180/337; 477/34, 43

(56) References Cited

U.S. PATENT DOCUMENTS

| 4,625,590 A | 12/1986 | Muller et al. ................. 74/866 |
| 5,389,050 A | 2/1995 | Sakai et al. .................... 477/78 |
| 5,531,654 A | 7/1996 | Ishikawa et al. ............ 477/120 |
| 5,555,170 A | * | 9/1996 | Nakashima .............. 364/424.1 |

* cited by examiner

*Primary Examiner*—Yonel Beaulieu

(57) ABSTRACT

The disclosed automatic transmission controller is capable of changing shift timing set for non-flat roads in correspondence to a judged driver type. The automatic transmission controller executes a driver type judging routine SUB2 to generate a judgment output related to the driver type by monitoring the driving of the vehicle and judges the driver type based on the judgment output. Shift timing is changed in running a non-flat road to correspond to the judged driver type. The shift timing in running the non-flat road may be changed by changing from an uphill slope mode 1 shift map to an uphill slope mode 2 shift map corresponding to the driver type or by increasing an upshift inhibiting section of a single map.

16 Claims, 18 Drawing Sheets

FUZZY INFERENCE RULE

FUZZY RULE (1) IF AVERAGE VEHICLE SPEED = LOW VEHICLE SPEED     ACCELERATOR HIGH OPENING TIME = SHORT    THEN OUTPUT = ECONOMY
(2) IF AVERAGE VEHICLE SPEED = LOW VEHICLE SPEED     ACCELERATOR HIGH OPENING TIME = MEDIUM   THEN OPUTPUT = SPORTY
(3) IF AVERAGE VEHICLE SPEED = LOW VEHICLE SPEED     ACCELERATOR HIGH OPENING TIME = LONG     THEN OUTPUT = SPORTY
(4) IF AVERAGE VEHICLE SPEED = MEDIUM VEHICLE SPEED  ACCELERATOR HIGH OPENING TIME = MEDIUM   THEN OUTPUT = ECONOMY
(5) IF AVERAGE VEHICLE SPEED = HIGH VEHICLE SPEED    ACCELERATOR HIGH OPENING TIME = MEDIUM   THEN OUTPUT = ECONOMY
(6) IF AVERAGE VEHICLE SPEED = HIGH VEHICLE SPEED    ACCELERATOR HIGH OPENING TIME = LONG     THEN OUTPUT = SPORTY
(7) IF AVERAGE VEHICLE SPEED = LOW VEHICLE SPEED     AVERAGE ACCELERATOR STEP-ON SPEED = FAST THEN OUTPUT = SPORTY
(8) IF AVERAGE VEHICLE SPEED = MEDIUM VEHICLE SPEED  AVERAGE ACCELERATOR STEP-ON SPEED = SLOW THEN OUTPUT = ECONOMY
(9) IF AVERAGE VEHICLE SPEED = MEDIUM VEHICLE SPEED  AVERAGE ACCELERATOR STEP-ON SPEED = FAST THEN OUTPUT = SPORTY
(10) IF AVERAGE VEHICLE SPEED = HIGH VEHICLE SPEED   AVERAGE ACCELERATOR STEP-ON SPEED = SLOW THEN OUTPUT = ECONOMY
(11) IF AVERAGE VEHICLE SPEED = HIGH VEHICLE SPEED   AVERAGE ACCELERATOR STEP-ON SPEED = FAST THEN OUTPUT = SPORTY

EXAMPLE 1: In case when average vehicle speed is 30 km, accelerator high opening time is 5 seconds and average accelerator step-on speed is 10%/s, the average vehicle speed is determined to be low vehicle speed, the accelerator high opening time to be short and the average accelerator step-on time to be slow. Then, only the inference rule (1) is applied and the fuzzy output turns out to be zero.

Example 2: In case when average vehicle speed is 60 km, accelerator high opening time is 15 seconds and average accelerator step-on speed is 35%/s, the average vehicle speed is determined to be medium vehicle speed, the accelerator high opening time to be short and medium and the average accelerator step-on time to be medium and fast. Then, the inference rules (4) and (9) are applied. Because the two inference rules are applied, the fuzzy output turns out to be 50 by using min-MAX centroid method.

FIG. 5

FIG. 7
EXAMPLE 2
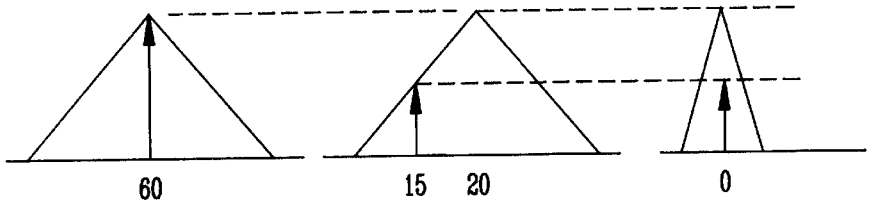
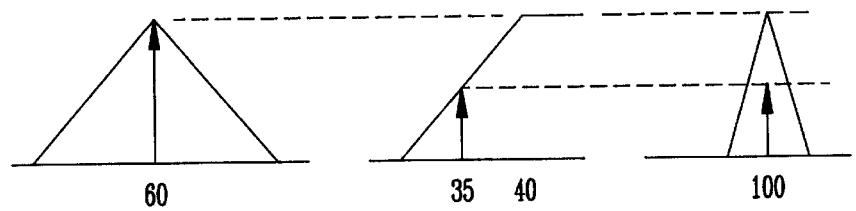
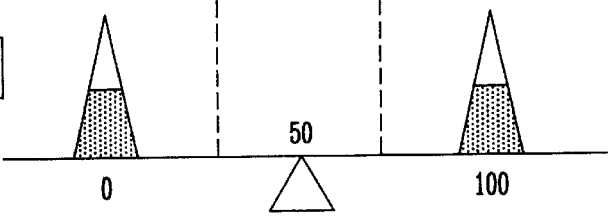

| CORNER DISCRIMINATING THRESHOLD VALUE | | |
|---|---|---|
| | S1 | S2 |
| ECONOMY | 3km/h | 2.5km/h |
| MEDIUM | 2km/h | 1.5km/h |
| SPORT | 1km/h | 0.5km/h |
| UP-SLOPE1 | 1km/h | 0.5km/h |
| UP-SLOPE2 | 1km/h | 0.5km/h |

MAP1

FIG. 13

CONTROLLER FOR AUTOMATIC TRANSMISSION

CROSS-REFERENCE TO RELATED APPLICATION

Our copending application 09/788,418, also entitled "CONTROLLER FOR AUTOMATIC TRANSMISSION" and filed on even date herewith, describes and claims related subject matter.

BACKGROUND OF THE INVENTION

1. Field of the Invention

The present invention relates to an automatic transmission controller which is capable of changing shift timing in accordance with type of driver.

2. Related Art

One type of known controller changes shift timing from that for a normal flat road hereinafter simply referred to as "standard shift timing") in accordance with actual running road conditions such as a hilly road or curvy road.

However, the shift timing has been changed corresponding only to the road condition or the driving style with respect to the standard shift timing in either case and no technology has yet been developed to reflect driving style where the shift timing has been changed from the standard shift timing in accordance with road conditions. Further, there is the problem of applying judgment regarding driving style on a flat road to a non-flat road, such as an uphill slope.

More specifically, because the extent of accelerator pedal depression increases in uphill running as compared to the case of running on a flat road, there is the possibility that an economy type driver, whose accelerator pedal depression is small on a flat road, will be judged to be a sport type driver on the basis of measurement of accelerator pedal depression in uphill running, and the control thereafter will not fit the driving style of the driver if the driving style is determined based solely on measurement of accelerator pedal depression.

Further, although the shift timing is normally switched to uphill shift timing upon start of uphill running, after running a flat road in a mid gear range with the sport type shift timing, a problem arises when an upshift is made even though the driver wants to continue to drive the current gear stage when the downshift timing for the current gear stage has been set more to the high-speed side than that for the sport type shift timing.

Moreover, when the shift timing is changed from the standard shift timing for an economy type driver in running around a corner or curve, an upshift is carried out quickly, which is unsatisfactory for a sport type driver. Conversely, when the shift timing is changed from the standard shift timing for a sport type driver in going around a curve or corner, the upshift is not carried out sufficiently soon to satisfy the economy type driver. Accordingly, the problem of how to reflect the driving style of a driver in cornering remains unsolved.

SUMMARY OF THE INVENTION

Accordingly, it is an object of the invention to provide an automatic transmission controller which is capable of changing shift timing in accordance with both the road running conditions, such as an uphill running and cornering, and the driving style of the driver.

According to a first aspect of the invention, an automatic transmission controller capable of detecting running road conditions, such as uphill running and going around a curve or corner, and of changing shift timing of a transmission in accordance with the detected road running conditions includes driver type judging means for generating a judgment output related to the driver type based on the driving conditions of the vehicle and for judging the driver type based on the judgment output. The controller further includes shift timing determination means for determining a shift timing corresponding to the road conditions and corresponding to the driver type, e.g., one of sport type, medium type and economy type, as judged by the driver type judging means, and shift control means for controlling the transmission based on the shift timing determined by the shift timing determining means.

For example, according to the first aspect of the invention, uphill running could dictate selection of an uphill road mode shift map and the determined driver type could dictate selection of one of a plurality of such shift maps, e.g. an uphill road mode 1 shift map UP-SLOPE1 wherein an upshift is inhibited in a predetermined corner section and an uphill road mode 2 shift map UP-SLOPE2. Alternatively, rather than selection between plural shift maps, the judgement of driver type could be applied to dictate an increase in the area of the upshift inhibiting section of a single shift map selected in accordance with road conditions. Thus, the shift timing may be changed not only by the road condition but also in a manner reflecting the driving style of the driver, allowing for finer shift control.

According to a second aspect of the invention, the driver type judging means generates a judgment output related to the driver type, the driving conditions of the vehicle and judges the driver type separately for different road conditions, e.g. separately for an uphill grade and for a flat road, based on the judgment output; and the shift timing changing means changes the shift timing according to the judged driver type. By judging the driving style separately for running on a flat road and for running on an uphill grade, the control may better account for the driving style of each individual driver, including a driver who has various driving styles for different road conditions.

The judgment output may be a value on a scale having lower and upper limits defined by a first value, e.g., 0, and a second value e.g., 100, which is greater than the first value, i.e., a scale of 0 to 100. Further, the judgment output may be based on average vehicle speed, duration (time) of accelerator high opening and average speed of accelerator pedal depression or average speed of throttle opening (as shown in FIG. 5 for example).

The driver type judging means may judge the driver type as belonging to one of a plurality of categories, e.g., a sport type, an economy type and a medium type, intermediate the sport and economy.

In a preferred embodiment, the driver type judging means judges the driver type separately for a flat road and for a non-flat road to generate judgment outputs as values on a scale of, e.g. 0 to 100, and judges the driver type as one of a sport type, an economy type and one or more types positioned between them based on the judgment output. For a given driver, a reference value on the sport type side (A>A', B'>B, C'>C, D'>D) is used in the judgment for a non-flat road, wherein the fuzzy outputs A', B', C', D' are for an uphill grade whereas the fuzzy outputs are A, B, C and D are for running on a flat road. In this manner it becomes possible to prevent an economy type driver, for example, from being erroneously judged to be a sport type driver when the economy type driver steps on the accelerator on an uphill grade.

In another preferred embodiment, the shift timing changing means changes the shift timing for the non-flat road so that a low-speed side gear stage is readily selected when the driver type judged by the driver type judging means is the sport type. This prevents an upshift when a sport type driver wants to continue running in the current gear stage when the vehicle makes the transition from a flat road to a non-flat road while running in an intermediate gear stage.

The shift timing changing means may include a memory containing stored therein a plurality of shift maps for running an uphill grade, e.g., an uphill road mode 1 shift map limit UP-SLOPE1 and an uphill road mode 2 shift map UP-SLOPE2, and selects a specific shift timing map from among the plurality of shift timing maps based on the driver type judged by the driver type judging means to determine shift timing in running the uphill slope. For example, where the first uphill shift map of the shift timing judgment changing means is a steep uphill road shift map and the second uphill road shift map is a moderate uphill road shift map, the shift timing changing means may be set to always select the steep uphill road shift map when the driver type judged by the driver type judging means is the sport type, so as to prevent an upshift from being made even though the sport type driver wants to continue to run with the current gear stage when the vehicle goes from a flat road onto a non-flat road while running with an intermediate gear stage.

Alternatively, the shift timing changing means may be set so that the low-speed side gear stage is selected rather than the shift timing (sport mode map SPORT) for running a flat road when the driver type is the sport type, so that it is possible to prevent an upshift from being made even though the driver wants to continue to run in the current gear stage.

In yet another embodiment, the shift timing changing means (SUB4) changes an upshift inhibiting section, e.g., corner section, of a shift map. This embodiment offers the advantage of simplicity.

In yet another embodiment, the shift timing changing means changes the upshift inhibiting section of a shift map in accordance with the degree of inclination of the uphill grade and with the driver type judged by the driver type judging means.

The above and other advantages of the invention will become more apparent in the following description and the accompanying drawings.

INCORPORATION BY REFERENCE

The entire teachings of Japanese Application No. 2000-45732, filed Feb. 23, 2000 are incorporated herein in their entirety, inclusive of the specification, claims and drawings. Likewise, the entire teachings of our copending application of the same title, filed on even date herewith, are incorporated herein by reference.

BRIEF DESCRIPTION OF THE DRAWINGS

FIG. 5 shows a fuzzy inference routine (step S21 in FIG. 4);

FIG. 7 is a diagram showing another example of output of arithmetic operation by the fuzzy inference routine;

FIG. 13 is one example of a table of corner determination threshold values;

DESCRIPTION OF THE PREFERRED EMBODIMENT

Figure 1:
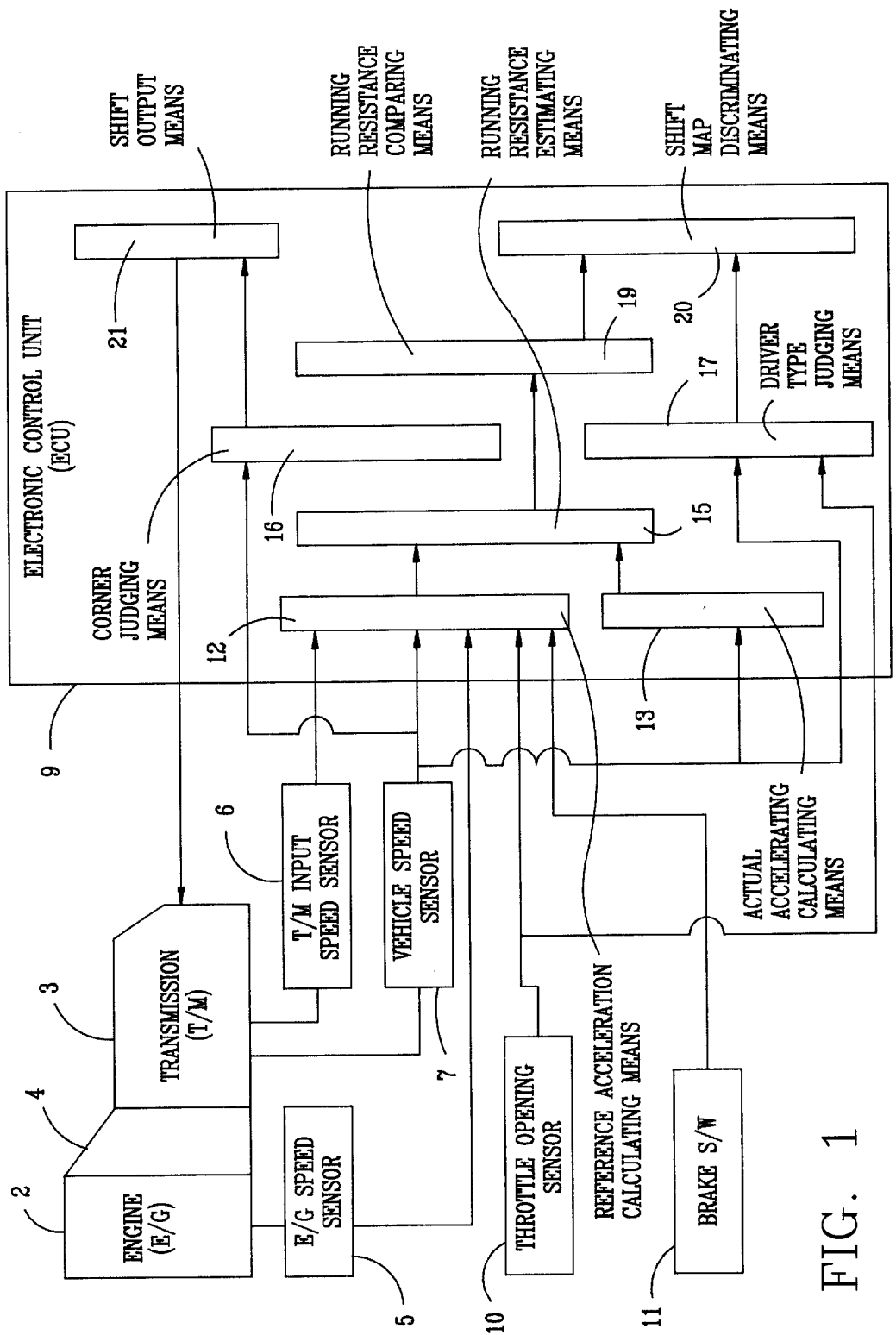
FIG. 1 is a block diagram illustrating one example of an automatic transmission controller in accordance with the present invention.

As shown in FIG. 1, a vehicle 1 such as a car has an engine 2 which is connected to a transmission 3 via a torque converter 4. The engine 2 is provided with an engine speed sensor for detecting rotational speed of an output shaft of the engine 2 and the transmission 3 is provided with an input speed sensor 6 for detecting rotational speed input to the transmission 3. A vehicle speed sensor 7 detects rotational speed of an output shaft of the transmission 3.

The engine speed sensor 5, the input speed sensor 6 and the vehicle speed sensor 7 are connected to an electronic control unit (ECU) 9 for controlling the transmission 3. The electronic control unit 9 also receives inputs from a throttle opening sensor 10 and a brake sensor The electronic control unit 9 comprises reference acceleration computing means 12, actual acceleration computing means 13, running resistance estimating means 15, corner determination means 16, a driver type judging section 17, running resistance comparing means 19, shift map determination means 20, shift output means 21, etc.

While the electronic control unit 9 controls the transmission 3 to change the rotation input from the engine 2, in accordance to a predetermined shift map so that the optimum driving force can be obtained at the wheels, it also controls the transmission 3 in a manner appropriate to the road condition, as described later, and appropriate for the driving style of the driver, i.e., the driver type, by changing the shift pattern. The details of the control will be described below.

Figure 2:
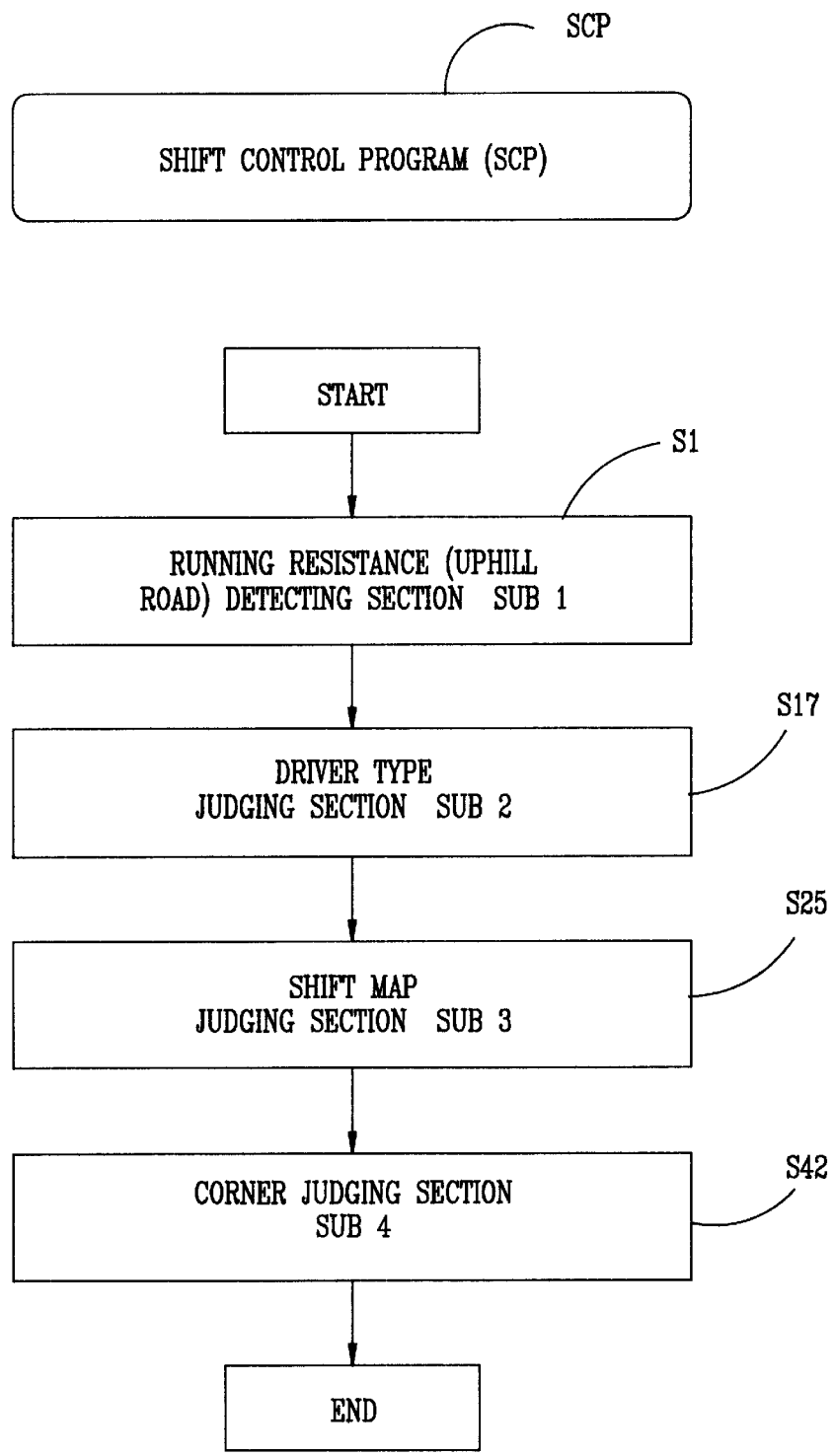
FIG. 2 is a flowchart of one example of a shift control program.

While running the vehicle 1, the electronic control unit 9 reads a shift control program SCP shown in FIG. 2 from a memory (not shown) and executes the program at a certain cycle to control the transmission 3 based on that program.

Figure 3:
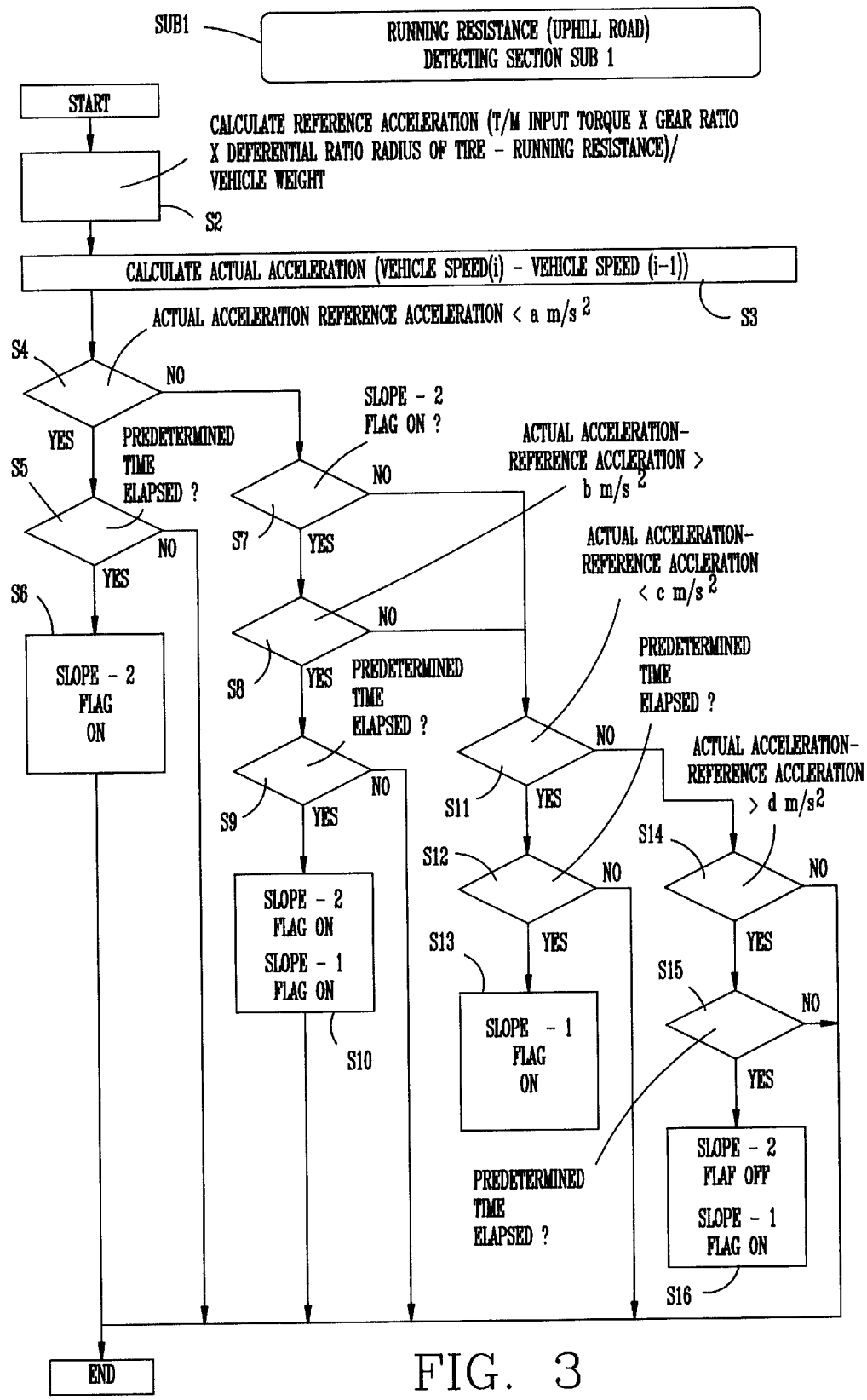
FIG. 3 is a flowchart of the running resistance (uphill road) detecting subroutine (step S1 in FIG. 2)

As shown in FIG. 2, the shift control program SCP executes a running resistance (uphill road) detecting subroutine SUB1 in Step S1. As shown in FIG. 3, the running resistance (uphill road) detecting subroutine SUB1 causes the reference acceleration calculating means 12 to compute the current reference acceleration of the vehicle 1 based on the outputs of the engine speed sensor 5, the input speed sensor 6, the vehicle speed sensor 7 and the throttle opening sensor 10, utilizing the following expression in Step S2:

(Transmission input torque×gear ratio×deferential ratio/radius of tire−running resistance)/car weight The term "reference acceleration" means accelerator depression estimated in running a flat road based on the current transmission input torque and gear ratio. The running resistance estimating means 15 of the electronic control unit 9 calculates and estimates the running resistance based on the current vehicle speed output from the vehicle speed sensor 7.

Next, the running resistance (uphill road) detecting subroutine SUB1 causes the actual accelerator calculating means 13 to calculate the actual acceleration of the vehicle 1 based on the output from the vehicle speed sensor 7 and, based on a value obtained by subtracting vehicle speed (i−1) sampled at the point of time immediately before that in Step S3 from vehicle speed (i) sampled at the point of time when the calculation is made, causes the running resistance comparing means 19 of the electronic control unit 9 to calculate the difference between the calculated actual acceleration and the reference acceleration and judges whether or not that difference is less than predetermined acceleration a $m/s^2$, i.e., whether or not sudden deceleration is indicated by the slope in Step S4. That is, because the steeper the slope, the more the speed of the vehicle 1 decelerates in running uphill, i.e., the steeper the slope, the more negative the acceleration (the difference between the actual acceleration and the reference acceleration).

Then, when it is judged in Step S4 that the difference between the calculated actual acceleration and the reference acceleration is less than predetermined acceleration a (<0) $m/s^2$, i.e., when the vehicle experiences sudden deceleration on a steep uphill grade, the routine goes to Step S5 to judge whether or not a predetermined time has elapsed in that state to prevent erroneous detection which might otherwise occur in using the judgment in Step S4 due to a local irregularity in the road. When it is judged in Step S5 that the predetermined time has elapsed in which the difference between the actual acceleration and the reference acceleration is less than the predetermined acceleration a $m/s^2$, the routine goes to Step S6 to judge that the road on which the vehicle is running is a steep slope and to turn on a slope-2 flag.

When it is judged in Step S4 that the difference between the actual acceleration and the reference acceleration is not less than the predetermined acceleration a $m/s^2$, i.e., that the vehicle is not undergoing such a sudden deceleration, the routine goes to Step S7 to judge whether or not the slope-2 flag has been already turned on, i.e., whether or not the vehicle 1 has been judged to be running on a steep slope at the time of the last sampling. When the slope-2 flag has been turned on, the routine goes to Step S8 to judge whether or not the difference between the actual acceleration and the reference acceleration calculated in Steps S2 and S3 is a predetermined acceleration b (b>a) $m/s^2$ or more.

When it is judged in Step S8 that the difference between the calculated actual acceleration and the reference acceleration is more than the predetermined acceleration b $m/s^2$, the routine goes to Step S9 to judge whether or not a predetermined time has elapsed in that state to prevent erroneous detection caused by a local irregularity in the road. Then, in Step S10, the running resistance (uphill road) detecting subroutine SUB1 judges that the road on which the vehicle is currently is running has changed from a steep slope to a moderate slope or to a flat road, based on the result in Step S8. It then turns off the slope-2 flag, turns on the slope-1 flag which means a moderate slope and prevents the control thereafter from being suddenly shifted from the control for a steep slope to a control for a flat road so that the transition from the uphill road control is made smoothly.

When the slope-2 flag is not ON in Step S7, i.e., when it has not been judged that the vehicle 1 is running up a steep slope in the most recent sampling, just before or when it has been judged in Step S8 that the vehicle is running on a slope in which the difference between the calculated actual acceleration and the reference acceleration is not more than the predetermined acceleration b $m/s^2$ and not less than a $m/s^2$, the program proceeds to Step S11 to judge whether or not the difference between the calculated actual acceleration and the reference acceleration is less than predetermined acceleration c $m/s^2$ and more than a $m/s^2$, i.e., a moderate deceleration. When it is judged in Step S11 that the difference between the calculated actual acceleration and the reference acceleration is less than the acceleration c $m/s^2$, the routine proceeds to Step S12 to judge whether or not a predetermined time has elapsed in that state to prevent an erroneous judgment due to a local irregularity in the road.

When it is judged in Step S12 that the predetermined time has elapsed in which the difference between the actual acceleration and the reference acceleration has remained less than the predetermined acceleration c $m/s^2$, the program goes to Step S13 to judge that the road on which the vehicle is currently running is a moderate uphill slope and turns on the slope-1 flag.

When it is judged in Step S11 that the difference between the actual acceleration and the reference acceleration is not less than the predetermined acceleration c $m/s^2$, the program advances to Step S14 to judge whether or not the difference between the actual acceleration and the reference acceleration is more than predetermined acceleration d $m/s^2$ (where, d>c>b>a), i.e., whether or not the difference between the actual acceleration and the reference acceleration is a degree of deceleration which is just lessened or is eliminated. When the difference between the actual acceleration and the reference acceleration is more than the predetermined acceleration d $m/s^2$, the running resistance (uphill) detecting routine SUB1 judges that the vehicle is no longer running on a slope and goes to Step S16 via Step S15 to turn off the slope flags 1 and 2.

When the running resistance (uphill slope) detecting subroutine SUB1 thus judges whether or not the degree of slope of the road on which the vehicle 1 is advancing is a sharp slope, a moderate slope or non-slope, the shift control program SCP goes to Step S17 in FIG. 2 to cause the driver type judging section 17 of the electronic control unit 9 to determine the type of driver currently driving the vehicle, i.e., a sports type driver who prefers sporty driving, an economy type driver who prefers economical driving or an intermediate type driver who is intermediate the former two categories.

Figure 4:
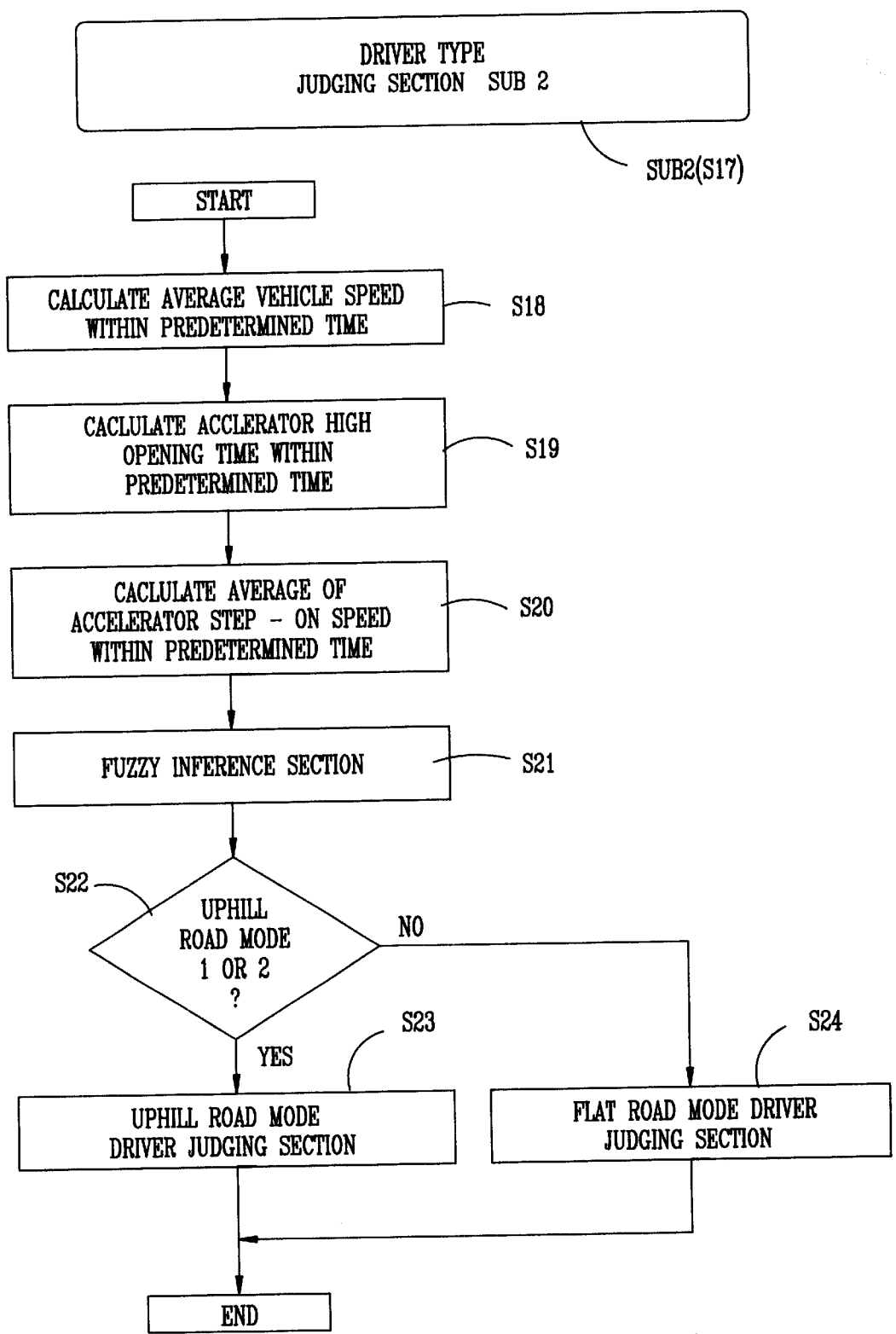
FIG. 4 is a flowchart of the driver type judging subroutine (step S17 in FIG. 2)

More specifically, the driver type judging section 17 executes a driver type judging routine SUB2 as shown in FIG. 4. That is, the driver type judging section 17 calculates average vehicle speed over a predetermined period of time, using the output of the vehicle speed sensor 7 in Step S18, and calculates a time during which the accelerator is operated with a high opening within the predetermined period of time, using the output of the throttle opening sensor 10 in Step S19. It also calculates an average value for speed of accelerator depression within the predetermined period of time in Step S20. Then, based on the results of those calculations, it evaluates the driver type by a fuzzy inference routine and outputs points on a scale of from 0 to 100 in Step S21.

Figure 6:
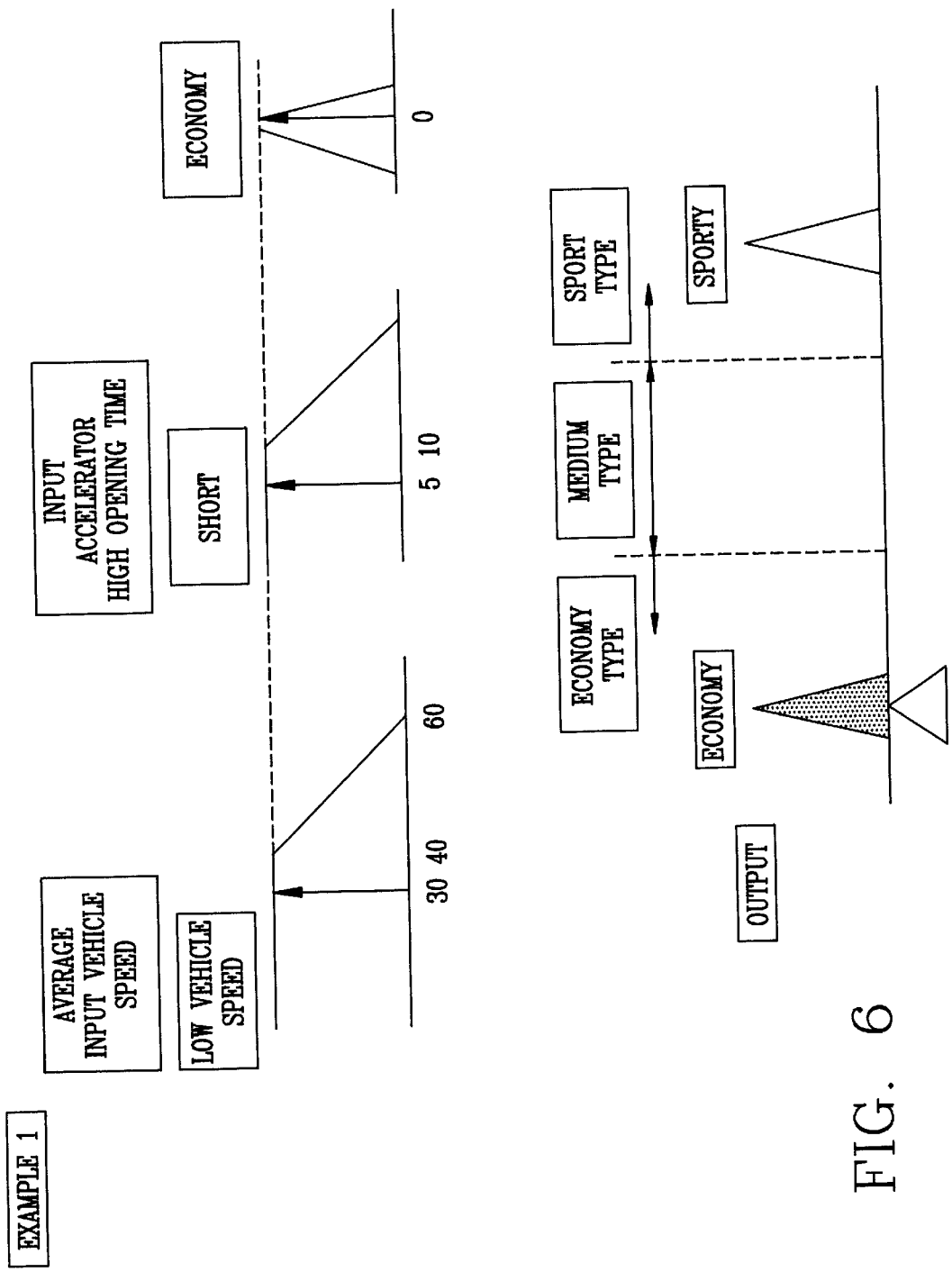
FIG. 6 is a diagram showing an example of output of arithmetic operation by the fuzzy inference routine.
Figure 8:
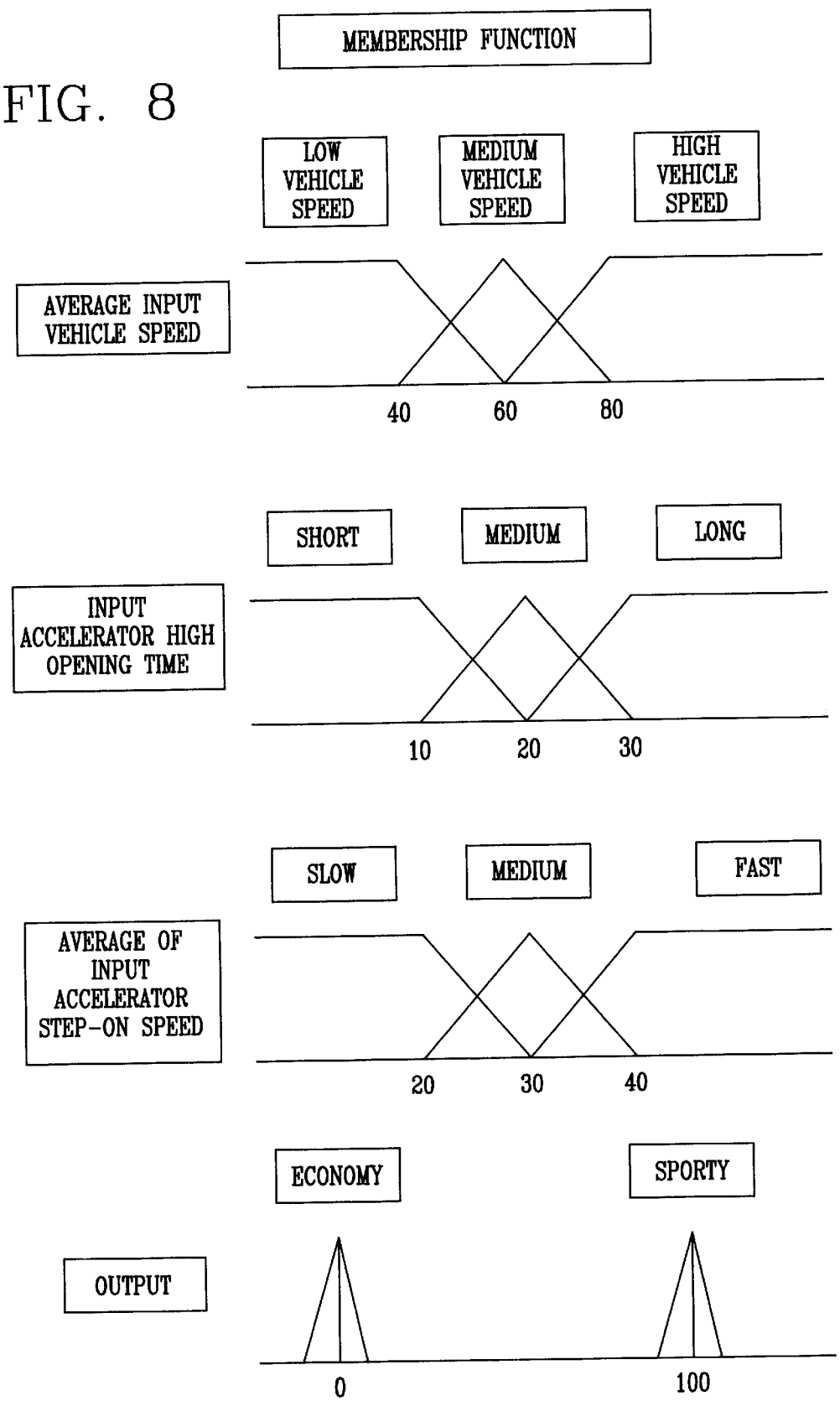
FIG. 8 is a diagram showing one example of a membership function in the fuzzy inference section.
Figure 9:
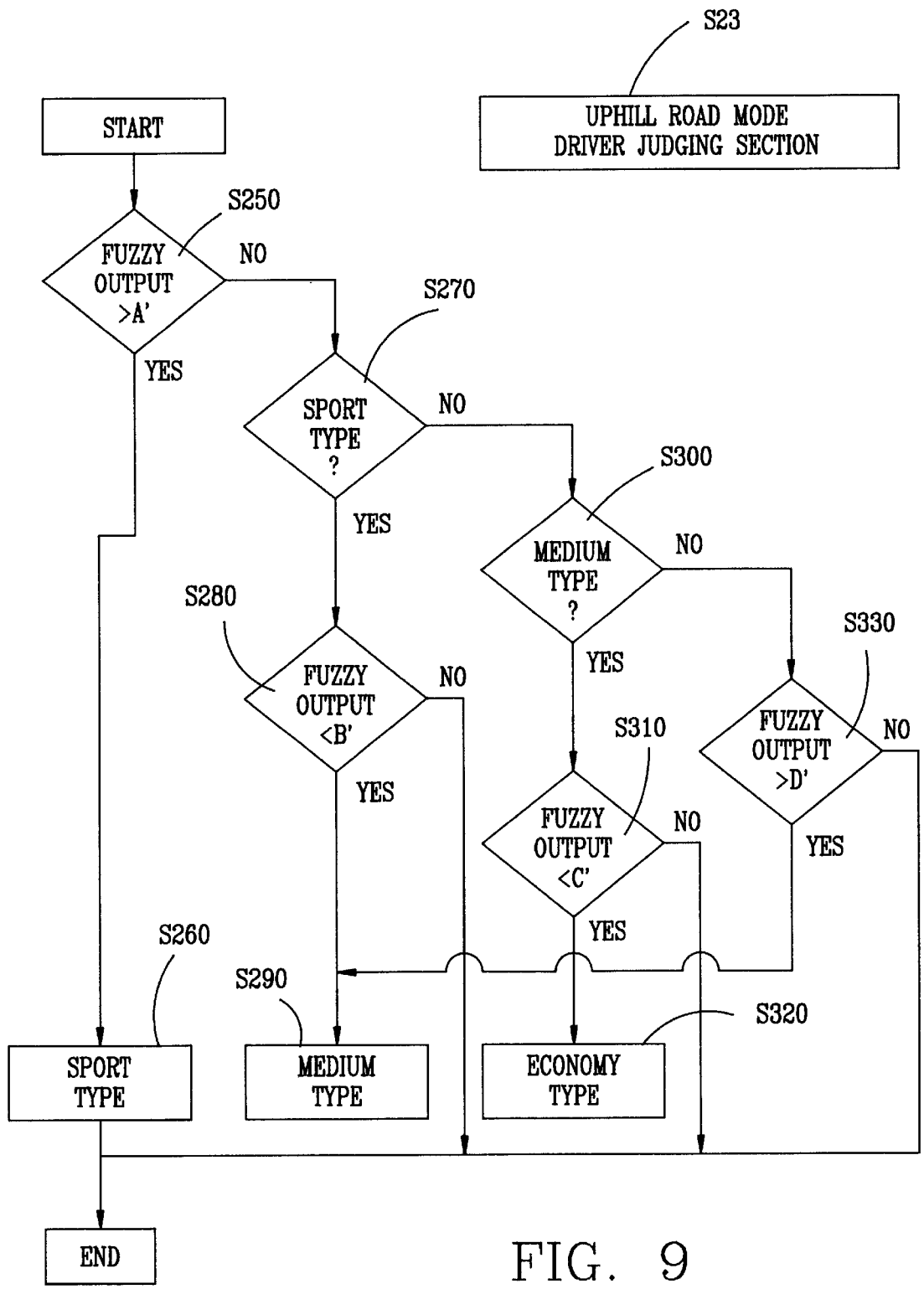
FIG. 9 is a flowchart of an uphill road mode driver type determination subroutine (step S23 in FIG. 4)

FIG. 5 shows a fuzzy rule applied in the fuzzy inference routine and FIG. 8 shows membership functions. For instance, when the average vehicle speed in Step S18 is 30 km, the time of accelerator high-opening in Step S19 is 5 seconds and the average speed of accelerator depression (speed of throttle opening) in Step S20 is 10%/second as shown in Example 1 in FIG. 5, the fuzzy rule (1) is applied and the membership function is applied as shown in FIG. 6, thus outputting 0 as a fuzzy output. When the average vehicle speed in Step S18 is 60 km, the accelerator high-opening time in Step S19 is 15 seconds and the average speed of accelerator depression in Step S20 is 35%/second as shown in Example 2 in FIG. 5, the fuzzy rules (4) and (9) are applied and the membership function is applied as shown in FIG. 7, thus outputting 50 as a fuzzy output.

After the output of the fuzzy inference routine in Step S21, the routine advances to Step S22. When either one of the slope-1 flag and the slope-2 flag is ON, as detected by the running resistance (uphill grade) detecting routine SUB1, the process advances to the uphill road mode driver judging routine in Step S23. Otherwise, the routine goes to a flat road mode driver judging routine in Step S24.

The uphill mode driver judging routine S23 judges that the driver is a sport type driver when the point of the fuzzy output is more than A' in Step S250. When the point of the fuzzy output is less than A' in Step S250, the uphill road mode driver type judging routine S23 judges whether or not the driver type of the driver has been judged to be the sport type (initial value is economy type) in Step S270. When the driver has been judged to be the sport type and the point of the fuzzy output is less than B' (<A") in Step S280, the uphill road mode driver type judging routine S23 judges that the driver is a medium type driver in Step S290 to prevent the evaluation of the driver type from immediately changing from the sport type to the economy type and to realize smooth execution of the shift. When the point of the fuzzy output is more than B' (<A') in Step S280, the judgment of the sport type is retained.

When the driver has not been judged to be the sport type in Step S270, the routine advances to Step S300 to judge whether or not the driver has been judged to be the medium type. When the driver has been judged to be the medium type, the routine advances to Step S310. Then the driver is judged to be the economy type in Step S320 when the point of the fuzzy output is less than C'0 (<B') or retains the judgment of medium type when the point of the fuzzy output is more than C' (<B'). On the other hand, when the driver type is not the medium type in Step S300, i.e., the driver is the economy type, it is judged whether or not the point of the fuzzy output is more than D' (B'>D'>C') in Step S330. When the point is D' or more (B'>D'>C'), the routine advances to Step S290 to judge that the driver is the medium type or retains the judgment of economy type when the point is less than D–(B'>D'>C').

Hysteresis is provided between A and B and B and C as thresholds for judging the sport type, medium type and economy type, between the direction of changing the judgment from the sport type to the medium and economy types and the opposite direction, to prevent the judgment from frequently changing around the thresholds. It should also be noted that the medium type positioned between the sport type and the economy type may be divided further into several types.

Figure 10:
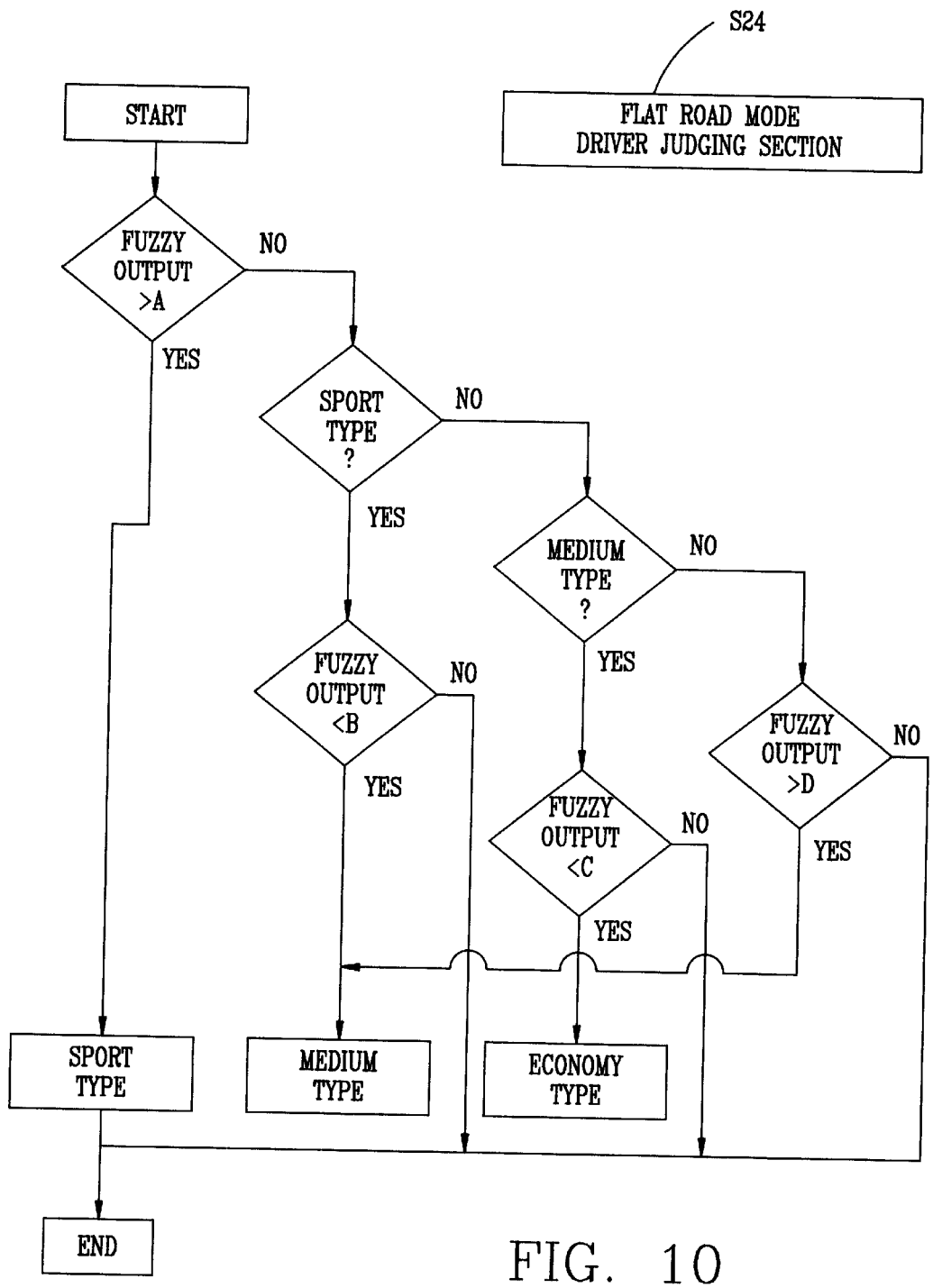
FIG. 10 is a flowchart of a flat road mode driver type determination subroutine (step S24 in FIG. 4)

The flat road mode driver judging routine S24 judges the driver type in a manner similar to that of the uphill road mode driver judging routine S23 as shown in FIG. 10. However, the threshold values A', B', C' and D' which are the reference values used in the uphill road mode driver judging routine are set above the threshold values A, B, C and D which are the reference values used in the flat road mode driver judging routine. Thus, the values A', B', C' and D' are set on the sport type side, i.e., A>A', B>B', C>C' and D>D', to compensate for the inclination to judge the driver type as the sport type because the accelerator is necessarily depressed in uphill travel.

Figure 11:
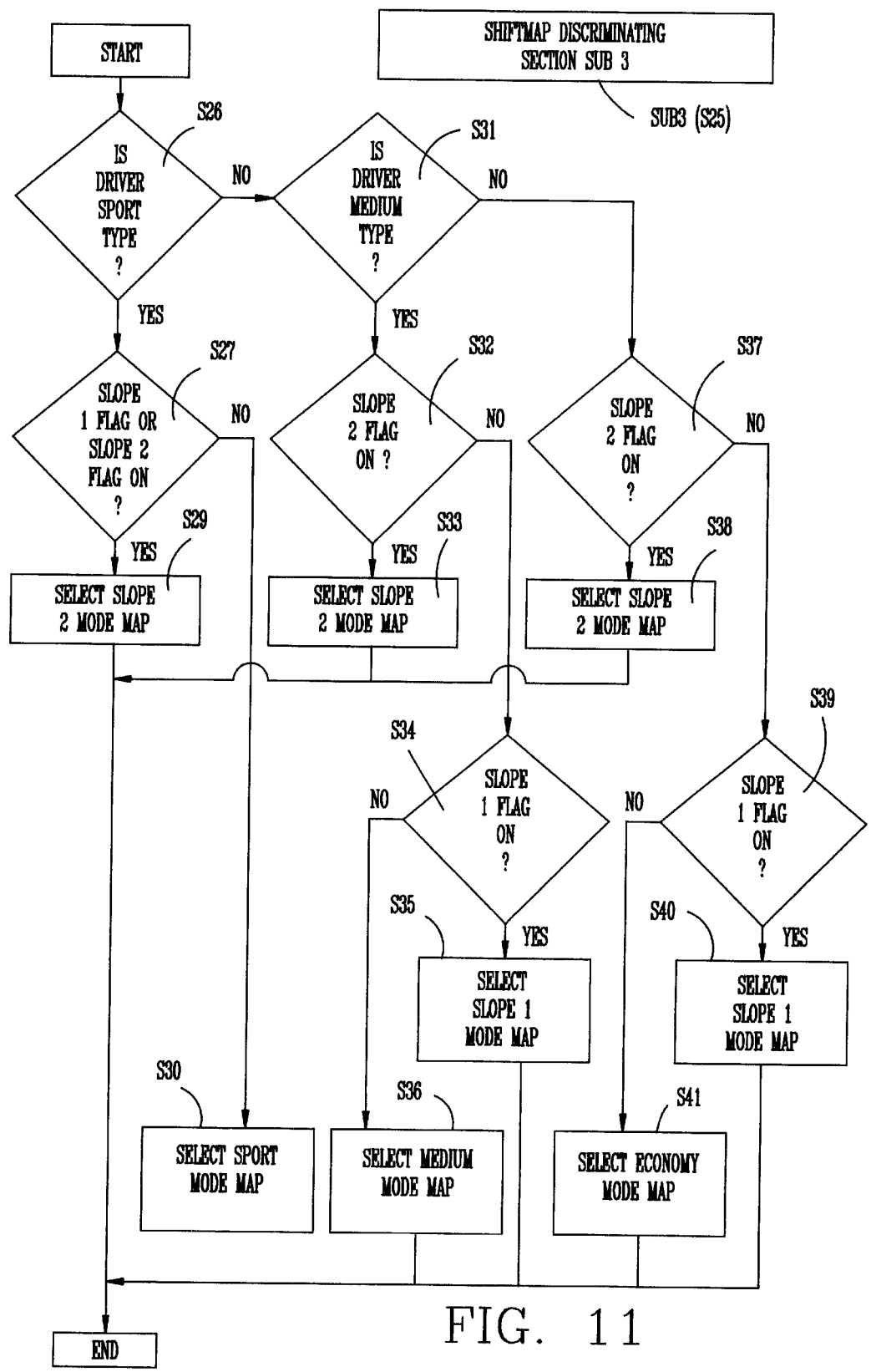
FIG. 11 is a flowchart of a shift map determination subroutine (step S25 in FIG. 2)

When the driver type has been judged in Step S17 in FIG. 1, the process advances to Step S25 and the shift map judging means 20 selects a shift map to be used in the shift operation by execution of a shift map judging routine SUB3. As shown in FIG. 11, the shift map judging routine SUB3 judges in Step S26 whether or not the driver type judged by the driver type judging routine SUB2 in Step S17 is the sport type. When the driver is determined to be the sport type, the routine advances to Step S27 to judge whether or not the slope-1 flag or the slope-2 flag of the uphill road detected by the running resistance (uphill grade) detecting routine SUB1 is ON. When the slope-1 flag or the slope-2 flag is ON, the routine advances to Step S29 to select an uphill road mode 2 map.

Figure 17:
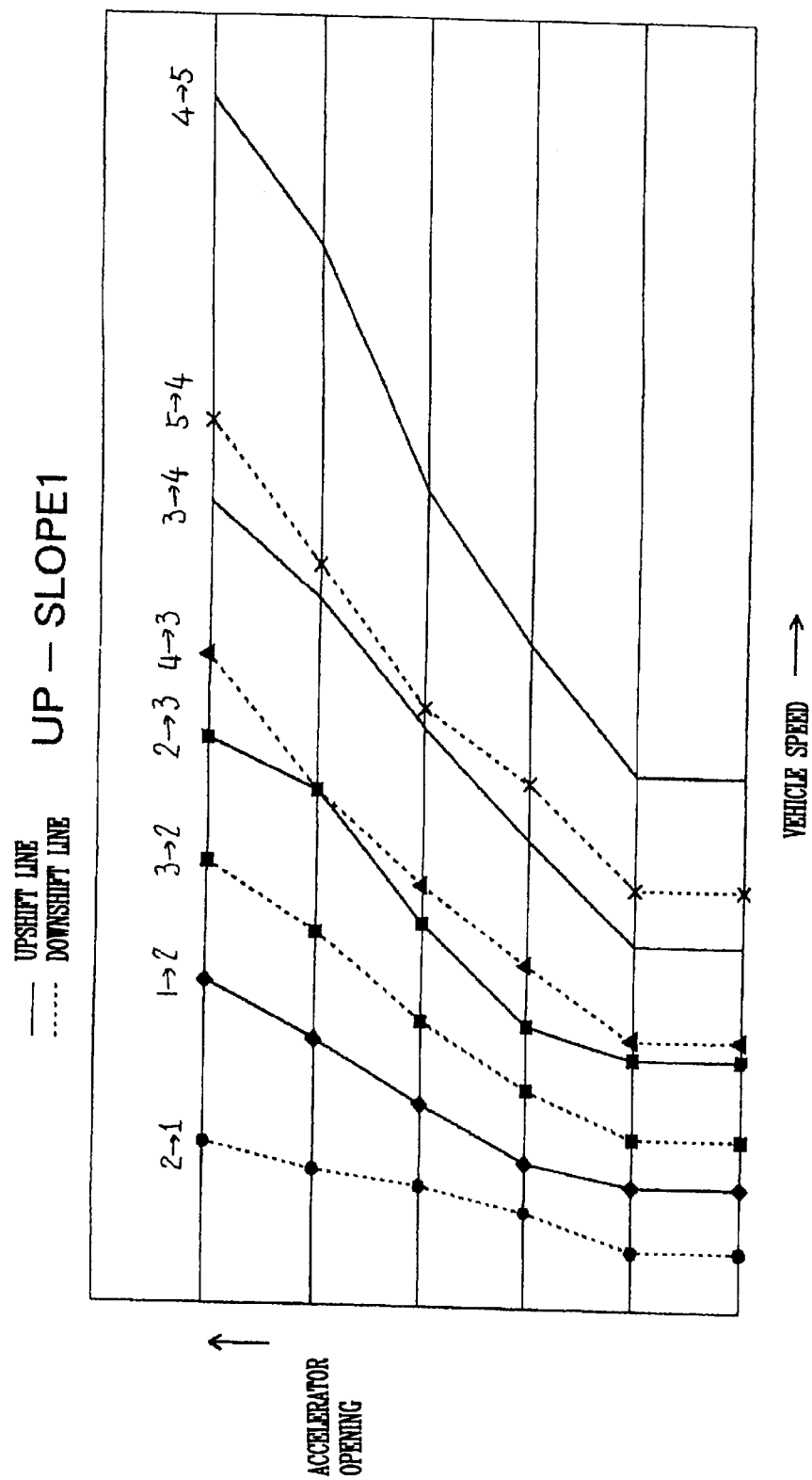
FIG. 17 is a graph showing one example of an uphill mode 1 shift map selectable by the subroutine of FIG. 11.
Figure 18:
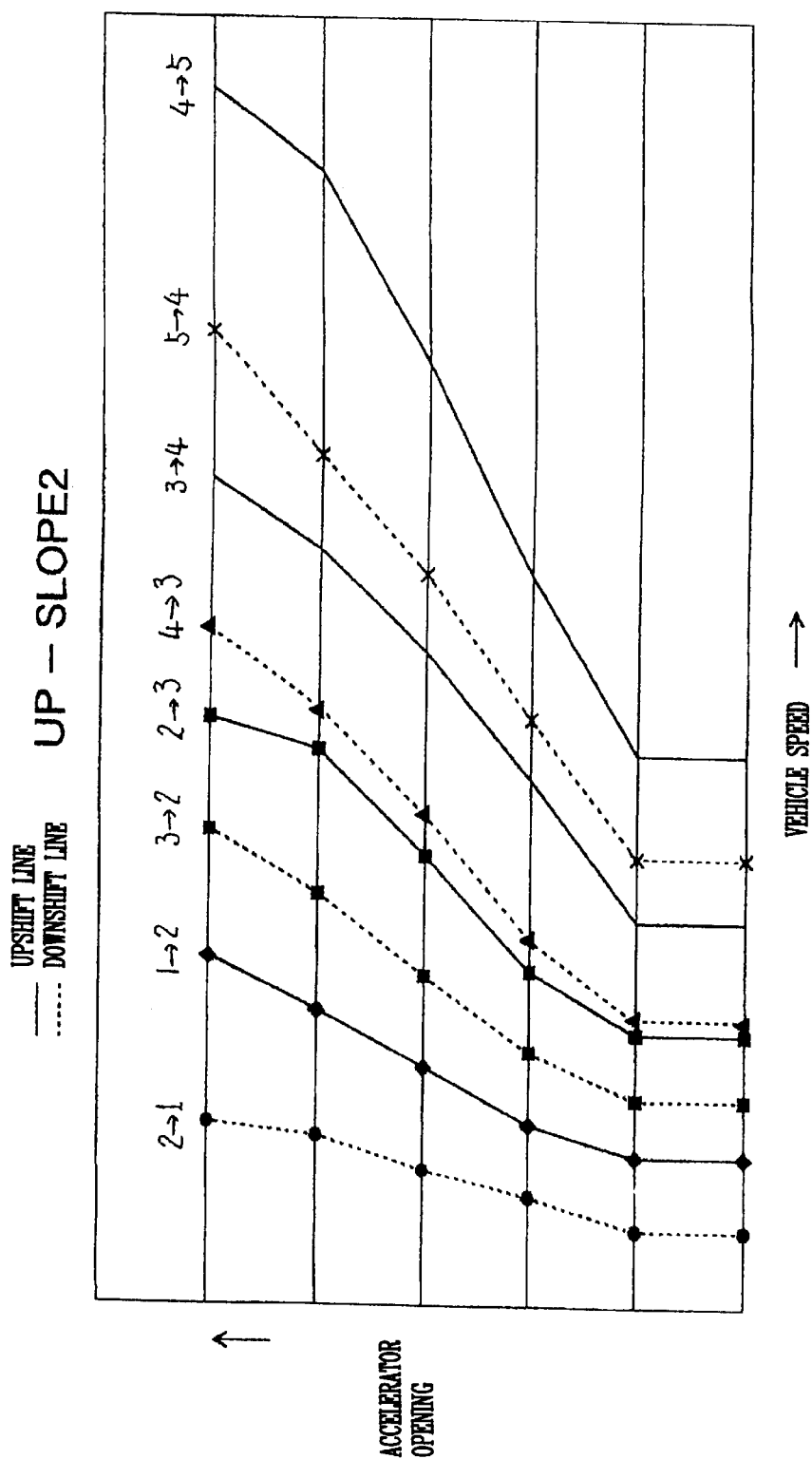
FIG. 18 is a graph showing one example of an uphill mode 2 shift map selectable by the subroutine in FIG. 11.

The electronic control unit 9 stores an uphill grade mode 1 shift map UP-SLOPE1 as shown in FIG. 17 and an uphill grade mode 2 shift map UP-SLOPE2 as shown in FIG. 18. The uphill grade mode 2 shift map UP-SLOPE2 is a map for a steep slope and the uphill road mode 1 shift map UP-SLOPE1 is a map for a moderate slope. Accordingly, the upshift and downshift lines of the uphill grade mode 2 shift map UP-SLOPE2 are shifted more to the high-speed side than those of the uphill grade mode 1 shift map UP-SLOPE1. Accordingly, for the same vehicle speed, a downshift is carried out at a lower accelerator opening using the uphill grade mode 2 shift map UP-SLOPE2. Further, at the same accelerator opening an upshift is carried out more on the high-speed side using the uphill road mode 2 shift map UP-SLOPE2. That is, the shift map UP-SLOPE2 is set for the so-called sporty style.

Thus, when the driver type is the sport type and the slope-1 flag or the slope-2 flag is ON in Step S27, the shift map judging routine SUB3 selects the uphill road mode 2, i.e., the steep slope map, in Step S29 and provides sporty style shift operation by selection of the steep slope shift map UP-SLOPE2 regardless of the grade of the slope.

Figure 14:
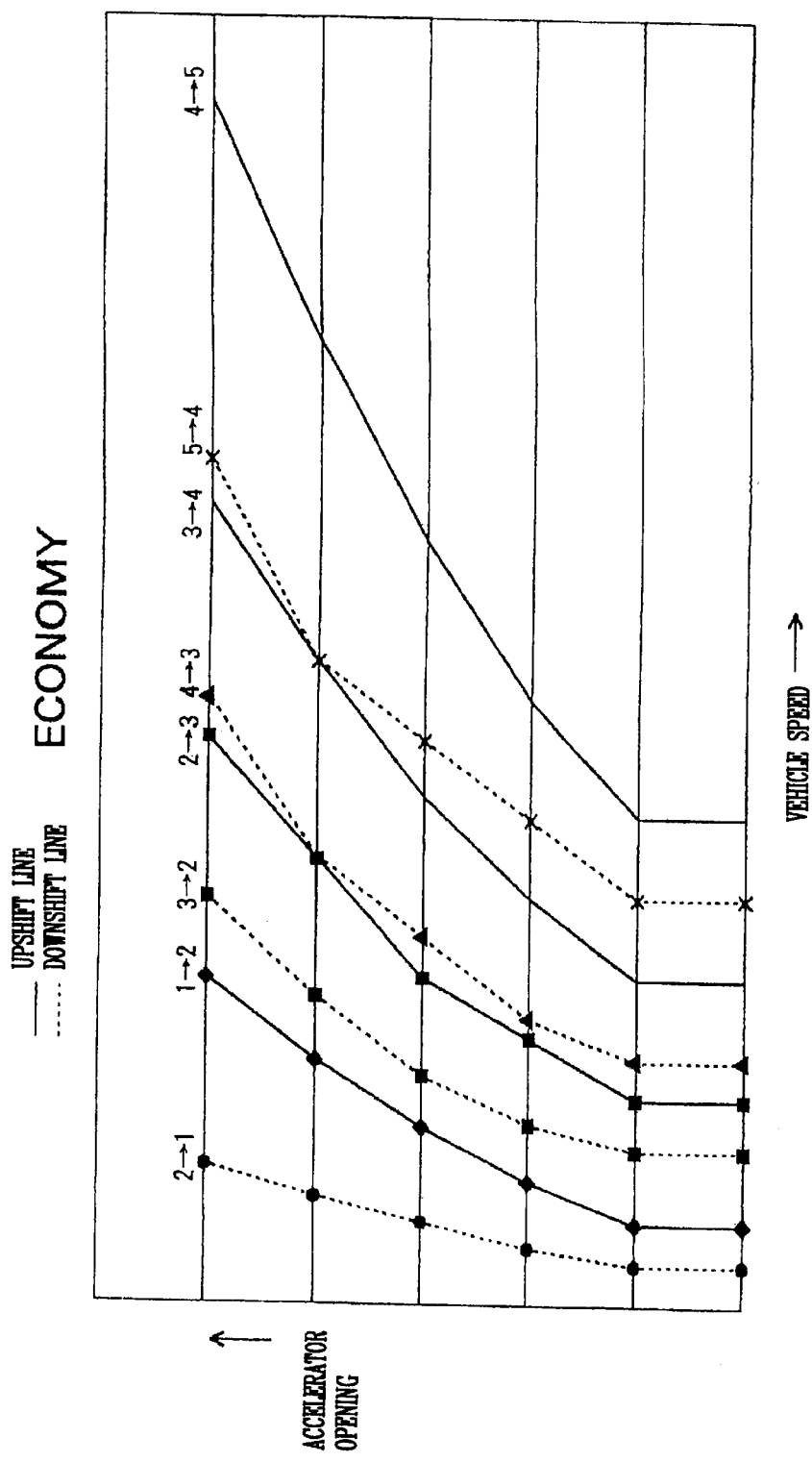
FIG. 14 is a graph showing one example of an economy mode shift map selectable by the subroutine of FIG. 11.
Figure 15:
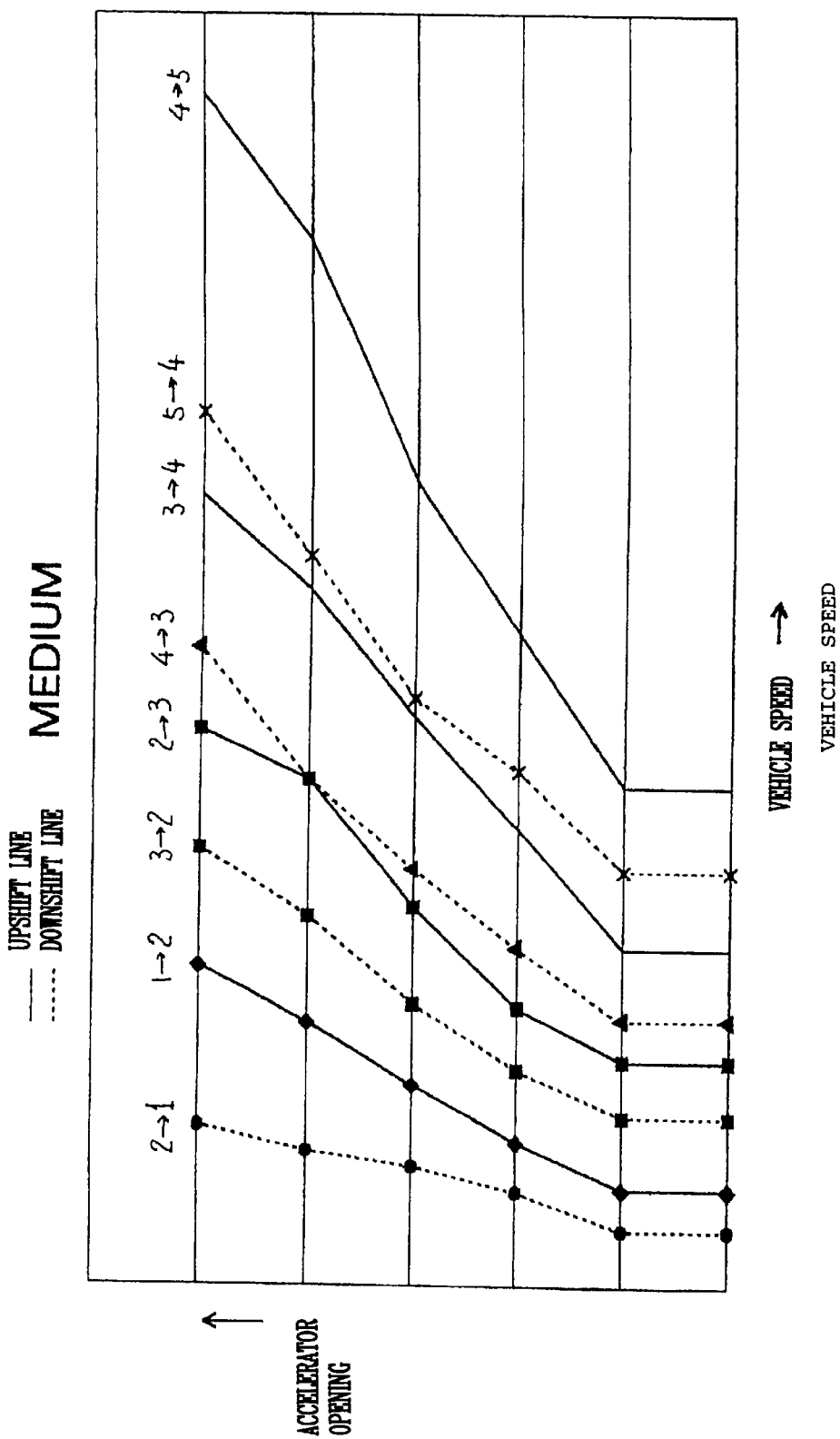
FIG. 15 is a graph showing one example of a medium mode shift map selectable by the subroutine of FIG. 11.
Figure 16:
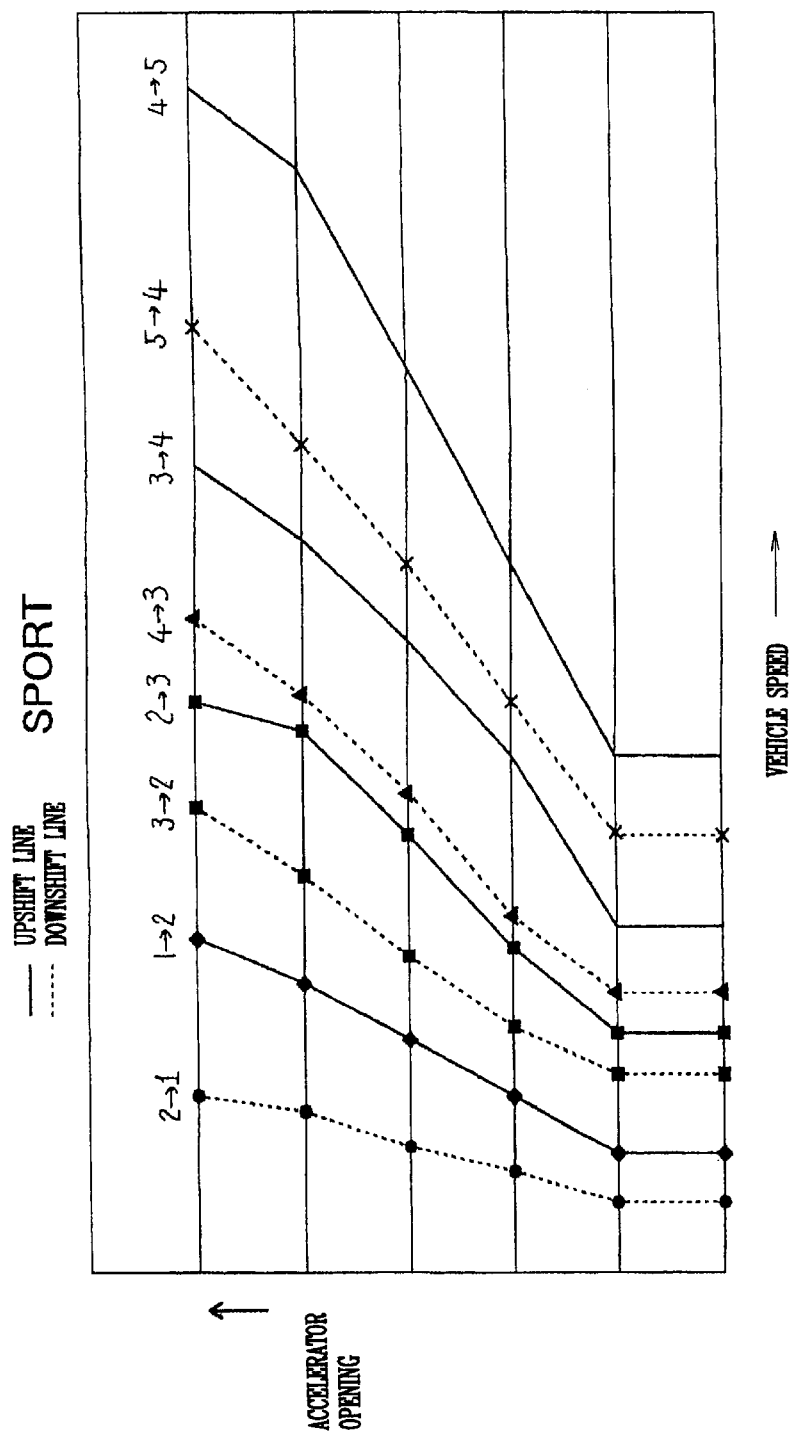
FIG. 16 is a graph showing one example of a sport mode shift map in FIG. 11.

Next, when neither of the slope-1 and slope-2 flags are ON, i.e., when the both flags are OFF in Step S27, the shift map judging routine SUB3 judges that the vehicle is running on a road other than an uphill slope and selects a sport mode map SPORT from among three running mode maps, i.e., among the economy mode map ECONOMY shown in FIG. 14, the medium mode map MEDIUM shown in FIG. 15 and the sport mode map SPORT shown in FIG. 16, prepared for running a flat (level) road.

As it is apparent from the maps, the economy mode map ECONOMY in FIG. 14, the medium mode map MEDIUM in FIG. 15 and the sport mode map SPORT in FIG. 16 are such that upshift and downshift lines are shifted to the high-speed side as the mode advances from the economy mode map ECONOMY to the medium mode map MEDIUM and to the sport mode map SPORT. Thus, for the same vehicle speed, a downshift is carried out at a lower accelerator opening and a lower speed side gear stage is selected as the mode goes from the economy mode map ECONOMY to the medium mode map MEDIUM and to the sport mode map SPORT. Further, at the same accelerator opening, the upshift is made at a higher-speed side as the type goes from the economy mode map ECONOMY to the medium mode map MEDIUM and to the sport mode map SPORT. That is, for a 'sporty style' driver the lower speed side gear stage may be readily selected. It is noted that the slope mode 2 shift map UP-SLOPE2 described above has its upshift line shifted more to the high vehicle speed side in the sport mode map SPORT so that the low-speed side gear step may be readily selected. In this manner, even when the vehicle starts on an uphill slope (grade) and the slope mode 2 map UP-SLOPE2 is selected in executing the next shift control program SCP after selecting the sport mode map SPORT in Step S30, the driver can continue in the sport mode without an upshift that would occur at the same vehicle speed in another mode and without a feeling of any sense of incompatibility. That is, when set for the sporty mode the lower speed side gear stage may be more readily selected.

When it is judged in Step S26 that the driver type judged by the driver type judging routine SUB2 in Step S17 is not the sport type, the routine advances to Step S31 to judge whether or not the driver type is the medium type. When the driver type is the medium type, the routine goes to Step S32 to judge whether or not the slope-2 flag of the uphill slope detected by the running resistance (uphill grade) detecting routine SUB1 is ON. When the slope-2 flag is ON, i.e., when it is judged that the vehicle is running up a steep slope, the routine goes to Step S33 to select the steep uphill grade mode 2 map.

When the slope-2 flag of the uphill slope is OFF, in Step S32, the routine goes to Step S34 to judge whether or not the slope-1 flag is ON. When the slope-1 flag is ON, the shift map judging routine SUB3 judges that the vehicle is running on a moderate slope and selects the uphill road mode 1 map UP-SLOPE1. When the slope-1 flag is OFF, the shift map judging routine SUB3 judges that the vehicle is not running on an uphill slope and goes to Step S36 to select the medium mode map MEDIUM in FIG. 15. Because the upshift and downshift lines shift gradually to the high-speed side as the mode advances from the medium mode map MEDIUM to the uphill slope mode 1 shift map UP-SLOPE1 and then to uphill slope mode 2 shift map UP-SLOPE2, a smooth shift operation corresponding to the grade of the slope may be made and the driver can drive in the up-hill mode without feeling any sense of incompatibility even when the vehicle starts an uphill and the UP-SLOPE1 or UP-SLOPE2 map is selected in Steps S33 and 34 in executing the next shift control program SCP after selecting the medium mode map MEDIUM in Step S33.

When it is judged in Step S31 that the driver type is not the medium type, i.e., the driver type is the economy type, the routine goes to Step S37 to judge whether or not the slope-2 flag is ON. When the slope-2 flag is ON, i.e., when it is judged that the vehicle is running up a steep slope, the routine goes to Step S38 to select the steep uphill slope mode 2 map.

When it is judged in Step S37 that the slope-2 flag of the uphill slope is OFF, the routine goes to Step S39 to judge whether or not the slope-1 flag of the uphill slope is ON. When the slope-1 flag is ON, the shift map judging routine SUB3 judges that the vehicle is running on a moderate slope and selects the uphill slope mode 1 map UP-SLOPE 1 in Step S40. When the slope-1 flag of the uphill slope is not ON, i.e., it is OFF, the shift map judging routine SUB3 judges that the vehicle is not running on an uphill slope and goes to Step S41 to select the economy mode map ECONOMY in FIG. 14. Because the upshift and downshift lines shift gradually to the high-speed side as the mode advances from the economy mode map ECONOMY to the uphill slope mode 1 shift map UP-SLOPE 1 and to uphill slope mode 2 shift map UP-SLOPE2, a smooth shift operation corresponding to the grade of the slope may be made and the driver can drive in the up-hill slope mode without feeling any sense of incompatibility even when the vehicle starts an uphill climb and the slope mode 1 or 2 map UP-SLOPE1 or UP-SLOPE2 is selected in Steps S37 and 39 in executing the next shift control program SCP after selecting the economy mode map ECONOMY in Step S41.

When the shift map to be used for shifting is thus determined in Step S25 of the shift control program SCP shown in FIG. 2, the shift control program SCP goes to Step S42 to cause the corner judging means 16 of the electronic control unit 9 to execute a corner judging routine SUB4.

Figure 12:
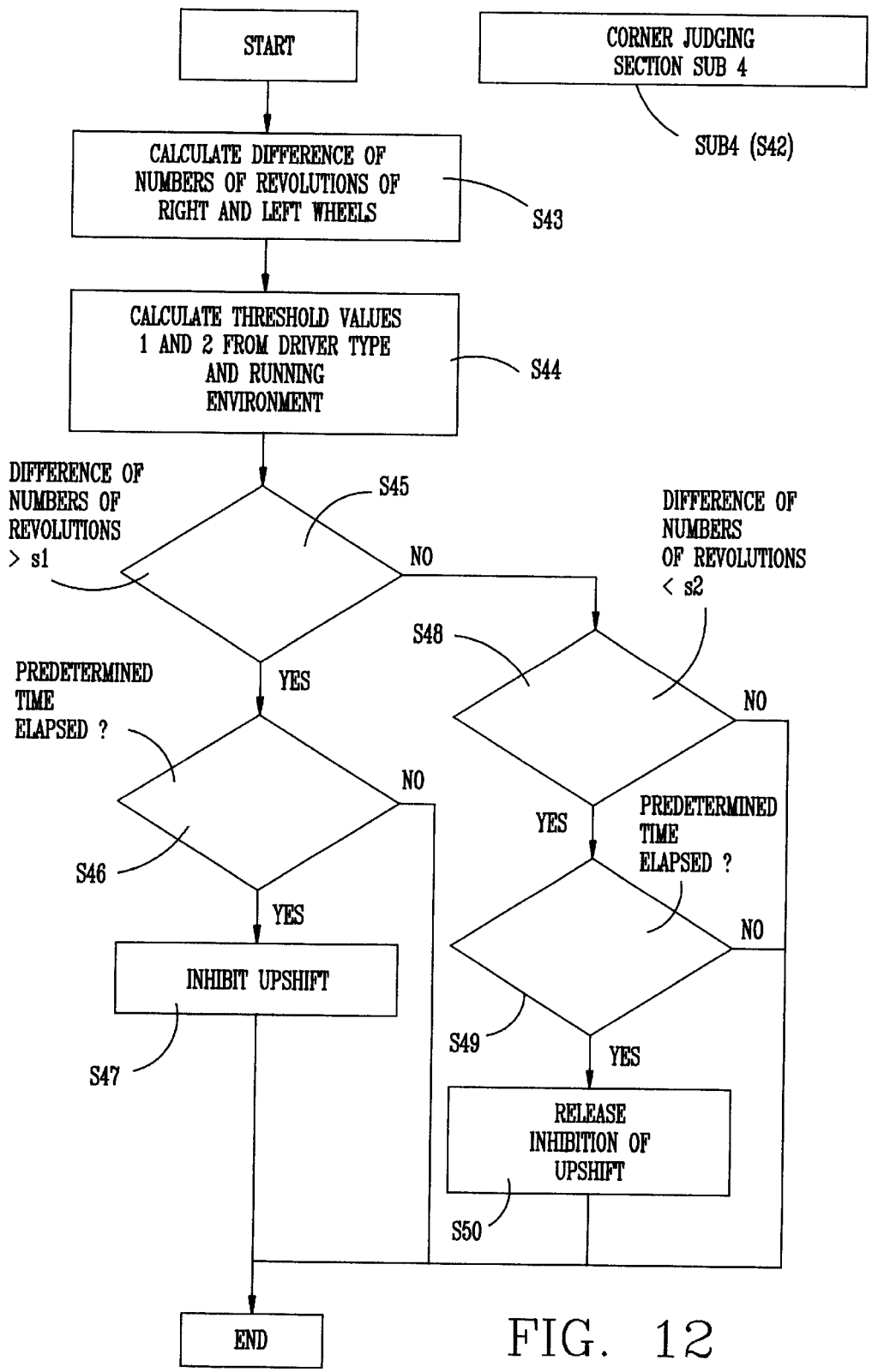
FIG. 12 is a flowchart of a corner judging subroutine (step S42 in FIG. 2)

As shown in FIG. 12, the corner judging section SUB4 calculates the difference between the rotational speeds of right and left wheels in Step S43. Because there is a difference between the rotary speeds of the right and left wheels in cornering, it is possible to detect when the vehicle starts and finishes going around a corner or sharp curve (cornering) in real-time by monitoring the difference in rotational speeds. After calculating the difference between the rotary speeds of the right and left wheels in Step S43, the corner judging routine SUB4 goes to Step S44 to calculate corner judging threshold values S1 and S2 from the driver type and the running environment. That is, the predetermined threshold values S1 and S2 are set by a threshold value map MAP 1 corresponding to the map judged and selected by the shift map judging routine SUB3 in Step S25 to be used for the shift, i.e., the economy mode map ECONOMY, medium mode map MEDIUM, sport mode map SPORT, uphill slope mode 1 shift map UP-SLOPE1 and uphill slope mode 2 shift map UP-SLOPE2, as shown in FIG. 13 and the value of the corresponding threshold values S1 and S2 may be found immediately from the threshold value map MAP 1 when the map to be used for the shift is selected.

Next, the corner judging routine SUB4 goes to Step S45 to judge whether or not the difference between the rotary speeds of the right and left wheels calculated in Step S43 is greater than the threshold value S1 found in Step S44. When the difference between the rotary speeds of the right and left wheels is greater than the threshold value S1 found in Step S44, the corner judging section SUB4 judges that the vehicle has started around a corner or sharp curve and inhibits upshift in Step S47 via Step S46.

As is apparent from FIG. 13, the threshold value S1 by which the upshift is inhibited becomes lower in the order of the economy mode map ECONOMY, medium mode map MEDIUM and sport mode map SPORT. It inhibits an upshift beginning when the difference between the rotary speeds of the right and left wheels is small, i.e., from the beginning of cornering, thus enabling sporty running. The threshold value S1 of the uphill slope mode 1 shift map UP-SLOPE1 and uphill slope mode 2 shift map UP-SLOPE2 are equal with that of the sport mode map SPORT so as to prevent an upshift from being made carelessly even when the vehicle starts up a slope under control of the sport mode map SPORT and the shift map judging section SUB3 has selected the uphill slope mode 1 shift map UP-SLOPE1 or the uphill slope mode 2 shift map UP-SLOPE2.

When it is judged in Step S45 that the difference between the rotary speeds of the right and left wheels is equal to or smaller than the threshold value S1 found in Step S44, the corner judging routine SUB4 goes to Step S48 this time to judge whether or not the difference between the rotary speeds of the right and left wheels is smaller than the threshold value S2 found in Step S44. When the difference between the rotary speeds of the right and left wheels is smaller than the threshold value S2 found in Step S44, the corner judging section SUB4 judges that the vehicle has completed travel around the corner or curve and releases the inhibition of upshift in Step S50 via Step S49.

As it is apparent from FIG. 13, the threshold value S2 which serves to release the inhibition of upshift becomes lower in the order of the economy mode map ECONOMY, medium mode map MEDIUM and sport mode map SPORT. It inhibits the upshift until when the difference between the rotary speeds of the right and left wheels becomes small, i.e., until nearing the end of the cornering, thus enabling sporty running. The threshold value S2 of the uphill slope mode 1 shift map UP-SLOPE1 and uphill slope mode 2 shift map UP-SLOPE2 are equal with that of the sport mode map SPORT so as to prevent an upshift from being made carelessly near the end of cornering even when the vehicle starts an uphill climb in the state in which the sport mode map SPORT has been selected and the shift map judging routine SUB3 selects the uphill slope mode 1 shift map UP-SLOPE 1 or the uphill slope mode 2 shift map UP-SLOPE2.

When the shift control program SCP shown in FIG. 2 determines the shift map to be used in shifting and determines cornering, shift output means 21 of the electronic control unit 9 controls the transmission 3 based on the selected shift map and the cornering determination.

It is noted that the present invention may be applied not only to running on an uphill slope and cornering as described above but also to running on a downhill slope, a snow covered road and off-road as long as the shift timing is further changed in accordance with the driver type in changing from timing for a non-flat road to timing for a non-flat road.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

We claim:

1. An automatic transmission controller, capable of changing shift timing of a transmission, comprising:

road condition detection means for detecting a road condition and changing shift timing of the transmission in accordance with the detected road condition;

driver type judging means for generating a judgment output related to the type of driver by monitoring driving behavior and judging the driver type as belonging to one of several different categories of driver type based on the judgment output;

shift timing changing means for additionally changing the shift timing, which has been changed in accordance with the detected road condition, to correspond to the driver type category judged by said driver type judging means; and shift control means for controlling said transmission based on the shift timing which has been changed by said shift timing changing means.

2. The automatic transmission controller according to claim 1, wherein said driver type judging means judges the driver type separately for different road conditions.

3. The automatic transmission controller according to claim 2, wherein said different road conditions include flat roads and non-flat roads.

4. The automatic transmission controller according to claim 1, wherein said judgment output is a value on a scale whose lower and upper limits are defined by a first value and a second value which is greater than the first value.

5. The automatic transmission controller according to claim 1, wherein said judgment output is generated based on average vehicle speed, time during which throttle is held open to at least a predetermined extent and average speed of accelerator depression over a predetermined period of time.

6. The automatic transmission controller according to claim 1, wherein said driver type judging means judges the driver type as one of sport type, economy type and one or more types intermediate said sport and economy types, based on said judgment output.

7. The automatic transmission controller according to claim 1:

wherein said driver type judging means judges the driver type separately for a flat road and for a non-flat road;

wherein said judgment output is a value on a scale whose lower and upper limits are defined by a first value and a second value which is greater than the first value;

wherein said driver type judging means judges the driver type as one of a sport type, an economy type and one or more types intermediate said sport and economy types, based on said judgment output; and wherein a reference value more to the sport type side is used to generate the judgment output when running a non-flat road rather than when running a flat road.

8. The automatic transmission controller according to claim 1, wherein said driver type judging means judges the driver type as one of at least two types including a sport type and an economy type based on said judgment output and said shift timing changing means changes the shift timing, which has been changed to correspond to said detected road condition, so that a low-speed side gear stage is more readily selected when the driver type is judged to be the sport type.

9. The automatic transmission controller according to claim 1, wherein said road condition is an uphill slope.

10. The automatic transmission controller according to claim 9, wherein said shift timing changing means stores a plurality of shift timings for uphill roads and selects a specific shift timing from among said plurality of shift timings based on the driver type judged by said driver type judging means to determine shift timing for running said uphill slope.

11. The automatic transmission controller according to claim 10, wherein said plurality of shift timings stored by changing means are stored as a corresponding plurality of shift maps, each showing different shift timings for running uphill, including a first uphill slope shift map and a second uphill slope shift map.

12. The automatic transmission controller according to claim 11, wherein said driver type judging means judges the driver type as one of at least into two types including a sport type and an economy type, based on said judgment output; wherein the first uphill slope shift map is for running a steep uphill grade and the second uphill slope shift map is for running a moderate uphill grade less steep than said steep uphill grade; and wherein said shift timing changing means always selects the steep uphill slope shift map when the driver type judged to be the sport type.

13. The automatic transmission controller according to claim 12, wherein the shift timing of said steep uphill slope shift map is set so that the low-speed side gear stage is more readily selected than in the shift timing for running a flat road when the driver type is the sport type.

14. The automatic transmission controller according to claim 1, wherein said road condition is a corner or curve to be turned.

15. The automatic transmission controller according to claim 14, wherein the change of the shift timing made by said shift timing changing means is a change of an upshift inhibiting section of a corner section of a shift map.

16. The automatic transmission controller according to claim 15, wherein said shift timing changing means changes said upshift inhibiting section in accordance with the grade in uphill running and in accordance with the driver type judged by said driver type judging means.

* * * * *

UNITED STATES PATENT AND TRADEMARK OFFICE
CERTIFICATE OF CORRECTION

PATENT NO.   : 6,571,162 B2
DATED        : May 27, 2003
INVENTOR(S)  : Kusafuka et al.

It is certified that error appears in the above-identified patent and that said Letters Patent is hereby corrected as shown below:

Title page,
Item [56], References Cited, U.S. PATENT DOCUMENTS,
"4,625,590" should read -- 5,625,590 --.

Drawings,
Figure 3, "S10", "SLOPE - 2 FLAG ON" should read -- SLOPE - 2 FLAG OFF --.
"S16", "SLOPE - 1 FLAG ON" should read -- SLOPE - 1 FLAG OFF --.

Column 4,
Line 46, after "sensor" insert -- 11. --.

Column 7,
Line 49, "C'0" should read -- C' --.

Column 11,
Line 38, "non-flat road" should read -- flat road --.

Signed and Sealed this

Seventh Day of October, 2003

JAMES E. ROGAN
*Director of the United States Patent and Trademark Office*